(12) United States Patent
Toš et al.

(10) Patent No.: US 12,404,004 B1
(45) Date of Patent: Sep. 2, 2025

(54) WING-FUSELAGE JOINT

(71) Applicant: Pipistrel d.o.o., Ajdovščina (SI)

(72) Inventors: Patrik Toš, Puče (SI); Gregor Čretnik, Ljubljana (SI)

(73) Assignee: Pipistrel d.o.o., Ajdovscina (SI)

( * ) Notice: Subject to any disclaimer, the term of this patent is extended or adjusted under 35 U.S.C. 154(b) by 0 days.

(21) Appl. No.: 18/591,248

(22) Filed: Feb. 29, 2024

(51) Int. Cl.
*B64C 1/26* (2006.01)
*F16B 5/02* (2006.01)

(52) U.S. Cl.
CPC . *B64C 1/26* (2013.01); *F16B 5/02* (2013.01)

(58) Field of Classification Search
CPC .................................. B64C 1/26; F16B 5/02
See application file for complete search history.

(56) References Cited

U.S. PATENT DOCUMENTS

| | | | |
|---|---|---|---|
| 7,887,009 B2 * | 2/2011 | Keeler, Jr. | B64C 1/26 244/119 |
| 9,663,225 B1 | 5/2017 | Kooiman et al. | |
| 9,981,750 B2 | 5/2018 | Williams et al. | |
| 10,040,562 B2 | 8/2018 | Kooiman et al. | |
| 2010/0155532 A1 * | 6/2010 | Ariza Martin | B64C 1/26 244/119 |
| 2011/0266398 A1 * | 11/2011 | Voss | B64C 1/26 244/45 R |
| 2022/0017205 A1 * | 1/2022 | Vingiani | B64C 1/26 |
| 2022/0048610 A1 * | 2/2022 | Diep | B64C 1/26 |

FOREIGN PATENT DOCUMENTS

EP 3118104 A1 1/2017

OTHER PUBLICATIONS

Extended European Search Report issued May 12, 2025 in EP Application No. 25159857.9.

* cited by examiner

*Primary Examiner* — Tye William Abell
(74) *Attorney, Agent, or Firm* — Avek IP, LLC

(57) ABSTRACT

A wing fuselage joint for an aircraft having joining members which include a first configuration and a second configuration. The joining members of the first configuration include a platform and bracket configured to pivot in a lateral plane and translate in a longitudinal direction. The joining members of the second configuration include a platform and bracket configured to pivot in a longitudinal plane and translate in a lateral direction. The joining members of either configuration join the fuselage structure and the spar of an aircraft together.

15 Claims, 17 Drawing Sheets

WING-FUSELAGE JOINT

CROSS-REFERENCE TO RELATED APPLICATIONS

None.

BACKGROUND OF THE INVENTION

1. Field

The disclosed embodiments relate generally to the field of aircraft. More specifically, the disclosed embodiments relate to the field of aircraft wing and fuselage connections.

2. Description of the Related Art

It is known to use pin joints to attach a wing to a fuselage on an aircraft. For example, in U.S. Pat. No. 7,887,009 to Keeler et al. the wing is attached to the fuselage using pin joints designed to transfer loads from the wings to the fuselage.

It is also known for a system to mount pylon assemblies in a tiltrotor aircraft. For example, in U.S. Pat. No. 10,040,562 to Kooiman et al. and U.S. Pat. No. 9,981,750 to Williams et al. describe similar systems using spherical bearings to secure pylons to a fuselage or for mounting other major aircraft components to an aircraft.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a wing-fuselage joint for an aircraft including: a first joining member, the first joining member including a first bracket pivotally mounted to a first platform, wherein the first platform is configured to mechanically couple to a fuselage structure and the first bracket is configured to mechanically couple to a wing spar; the first platform being configured to pivot in a first plane and translate in a second direction, wherein the first plane is lateral and aligned with the wing spar and the second direction is perpendicular in relation to the wing spar; a second joining member, the second joining member including a second bracket pivotally mounted to a second platform, wherein the second platform is configured to mechanically couple to the fuselage and the second bracket is configured to mechanically couple to the wing spar; and the second platform being configured to pivot in a second plane and translate in a first direction, wherein the second plane is longitudinal and aligned with the second direction and the first direction is lateral and aligned with the first plane.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
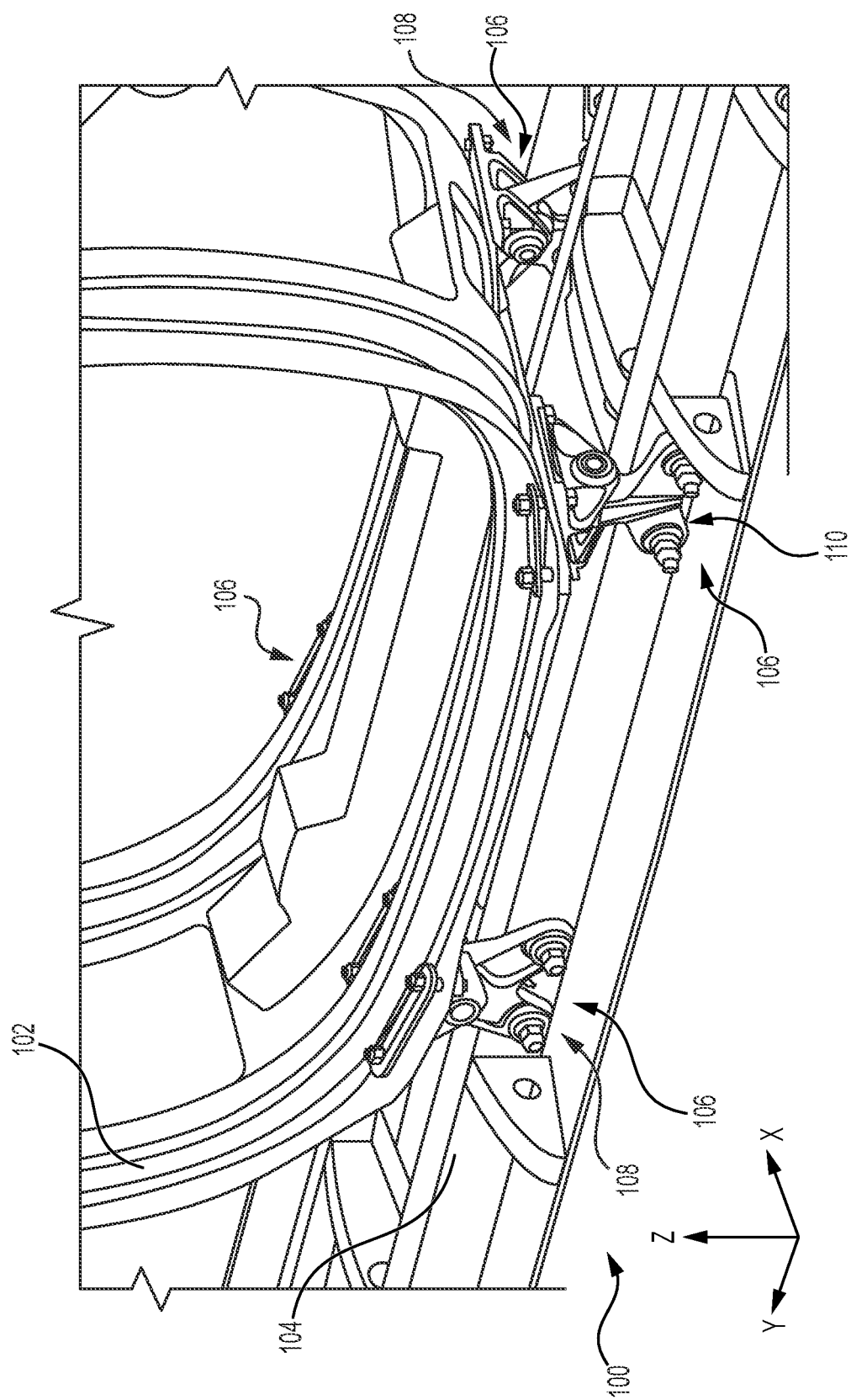
FIG. 1 shows a perspective view of the wing-fuselage joint mounted to an aircraft structure.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments disclosed herein provide an arrangement for having an improved wing-fuselage joint on an aircraft. Connectors with high strength used for joining a wing and a fuselage together on an aircraft are essential for an aircraft structure. In current arrangements, a wing-fuselage joint may include a bolted joint connection which has high strength, but may have flexibility restrictions, and may require highly complex tooling for manufacture, increasing the cost and time of production. Additionally, specialized analysis is required for current wing-fuselage connections due to the presence of stress concentrations. The connectors must also be able to be rapidly assembled or disassembled to enable transportation of the aircraft. A wing-fuselage joint is needed which may be assembled quickly while also being able to withstand various types of loads such as aerodynamic, ground reaction, vibration, shock, and thermal.

Embodiments disclosed herein, include a wing-fuselage joint for connecting the wing and fuselage structures of an aircraft. The wing-fuselage joint in embodiments comprises spherical bearings and supporting structures having sufficient strength to withstand numerous different types of loading. The wing-fuselage joint transfers the shear forces experienced by an aircraft's wings in numerous directions to the fuselage of an aircraft while substantially preventing the bending moment from being transferred to the fuselage structure. The reduction or elimination of the bending moment to the fuselage allows for the fuselage structure size, complexity, cost, and manufacture time, to be reduced.

FIG. 1 shows a wing-fuselage joint 100 mounted onto an aircraft structure in an embodiment. The wing-fuselage joint 100 is configured for mounting a fuselage structure 102 with a wing structure or spar 104. The fuselage structure is for example a girder or frame station. The fuselage structure 102 and the spar 104 provide structural support for the fuselage and the wings of an aircraft respectively. The wing-fuselage joint 100 is mounted to members of both the fuselage structure 102 and the spar 104 and mechanically couples the fuselage structure 102 and spar 104 together. The wing-fuselage joint 100 includes four joining members 106 (three may be seen in FIG. 1). The joining members 106 include components to attach and secure to the fuselage structure 102 and spar 104 in four separate locations in embodiments. The joining members may be placed on a forward spar, aft spar, a forward bulkhead, or an aft bulkhead. The joining members 106 include two different configurations with two joining members 106 having a first configuration and another two joining members having a second configuration.

In embodiments and with reference to FIG. 1, the X direction is defined as a longitudinal direction aligned forward and aft along the length of the fuselage, the Y direction is a lateral direction that spans left and right across the aircraft in the main direction of the wings, and the Z direction is a vertical direction aligned up and down. The first joining members 108 having the first configuration are configured to transfer forces experienced by the wings or spar 104 to the fuselage structure 102 in the Y and Z directions, and the second joining members 110 having the second configuration are configured to transfer forces experienced by the wings or spar 104 to the fuselage structure 102 in the X and Z directions.

Figure 2:
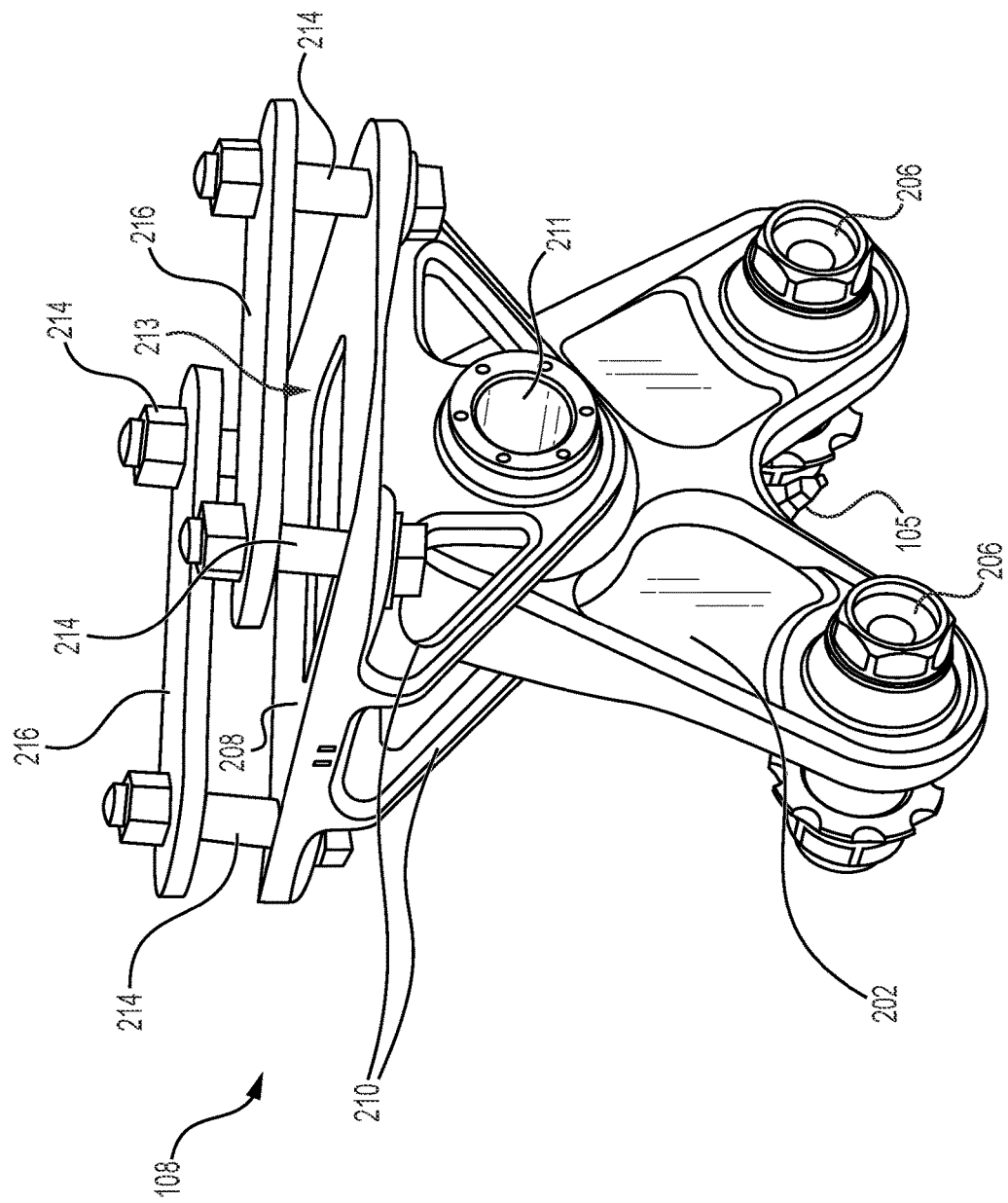
FIG. 2 shows a perspective view of a first joining member of the wing-fuselage joint.

FIG. 2 shows a close-up perspective view of one of the first joining members 108. Each first joining member 108 includes a mounting platform 208. The mounting platform 208 is substantially square shaped in embodiments and includes a center aperture 213 removed from a middle area of the mounting platform 208. At each of the four corners of the mounting platform 208, a bolt and nut arrangement 214 is inserted into a fastener hole in the mounting platform 208. The bolt and nut arrangement 214 is configured such that the bolt head is positioned on the underside surface of the mounting platform 208 such that the shaft of the bolt extends upwards and through the fastener hole in the mounting platform 208. As each bolt shaft extends upwards one end of a fastener plate 216 is slid onto the bolt shaft with a nut being threadingly secured onto the upper end of the bolt shaft. The mounting platform 208 includes two fastener plates 216 with one fastener plate 216 being inserted on one end of the forward-right bolt and nut arrangement 214 and on the other end being inserted onto the back-right bolt and nut arrangement 214. Another fastener plate 216 is inserted onto the forward-left bolt and nut arrangement 214 and on the other end is inserted onto the back-left bolt and nut arrangement 214. The fastener plates 216 span from the forward to the back edges of the mounting platform 208 and are positioned along the left and right sides of the mounting platform 208.

Figure 3A:
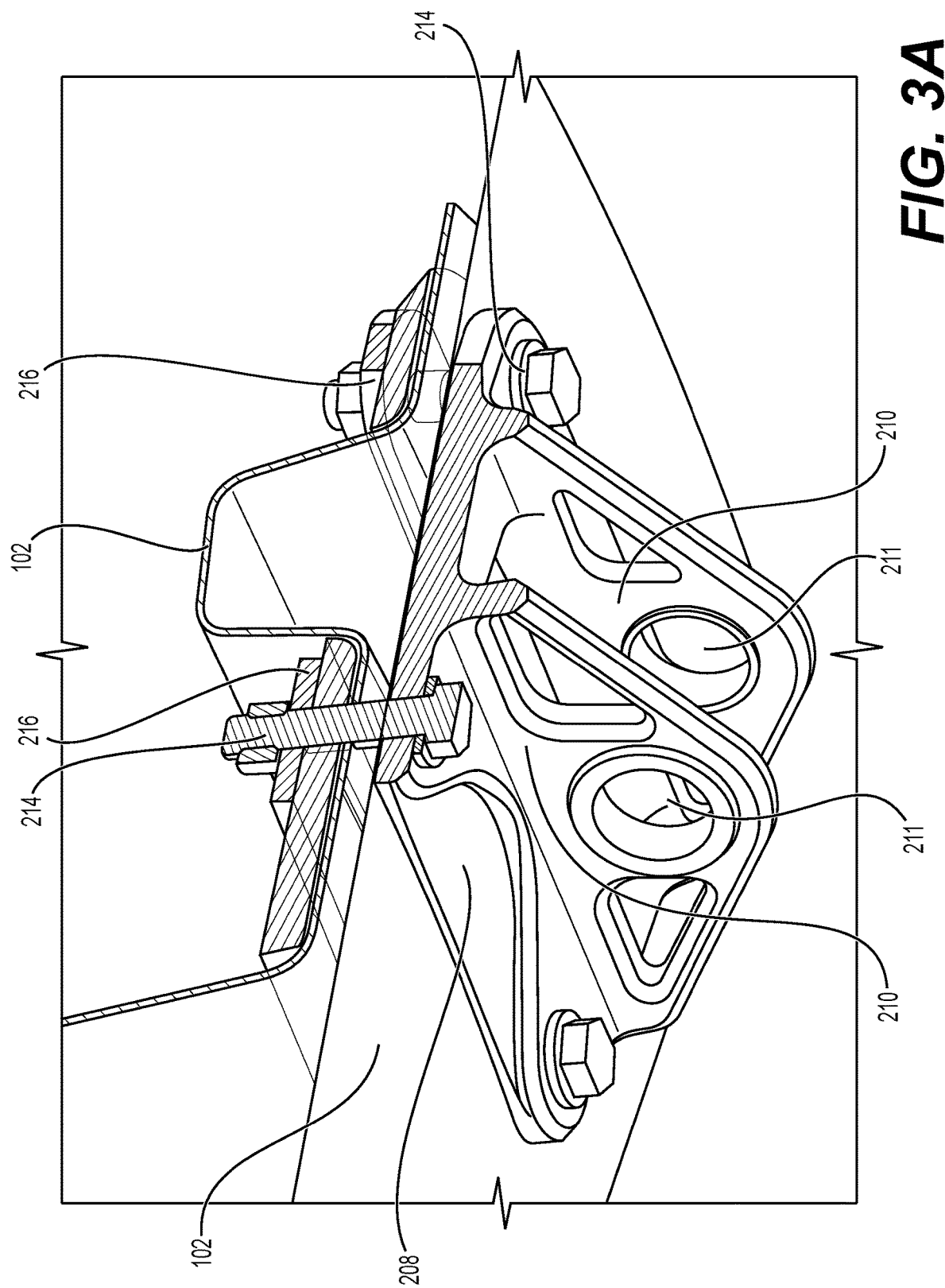
FIG. 3A shows a perspective view of a mounting platform of the first joining member of FIG. 2 mounted to a fuselage structure.

FIG. 3A shows a bottom perspective view of the mounting platform 208 mounted to the fuselage structure 102. The mounting platform 208 includes two downwardly extending flanges 210 which each include a fastener hole 211 diametrically sized to allow a shear pin 207 (FIG. 3D) to insert and couple the mounting platform 208 to a plane bearing 112. The flanges 210 are spaced opposite each other and mounted on the underside of the mounting platform 208 such that a first bracket 202 (FIG. 3D) is able to pivot on the plane bearing 112 in between the flanges 210.

Figure 3B:
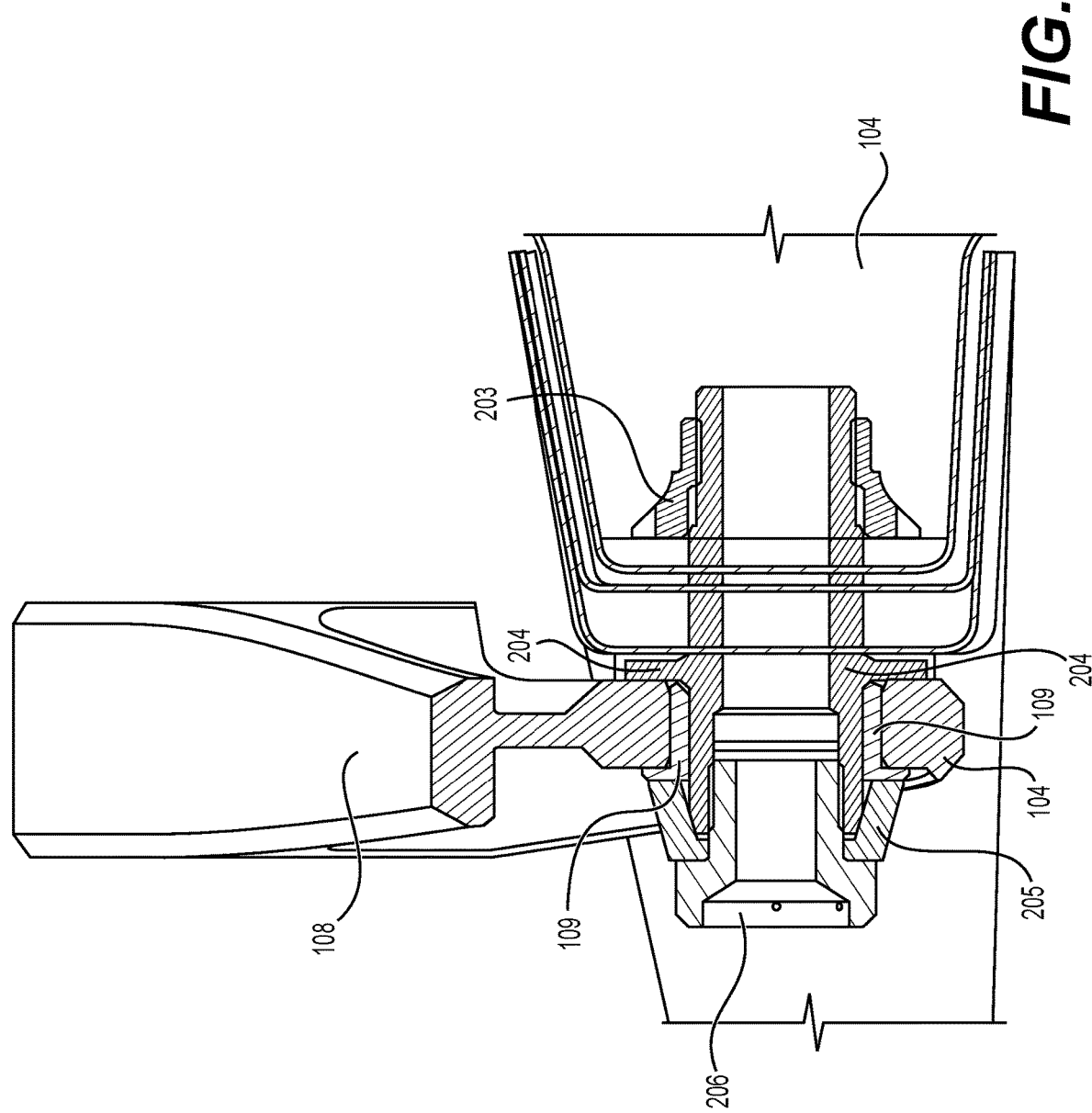
FIG. 3B shows a cross-sectional view of the first joining member mounted to a spar of a wing.
Figure 3C:
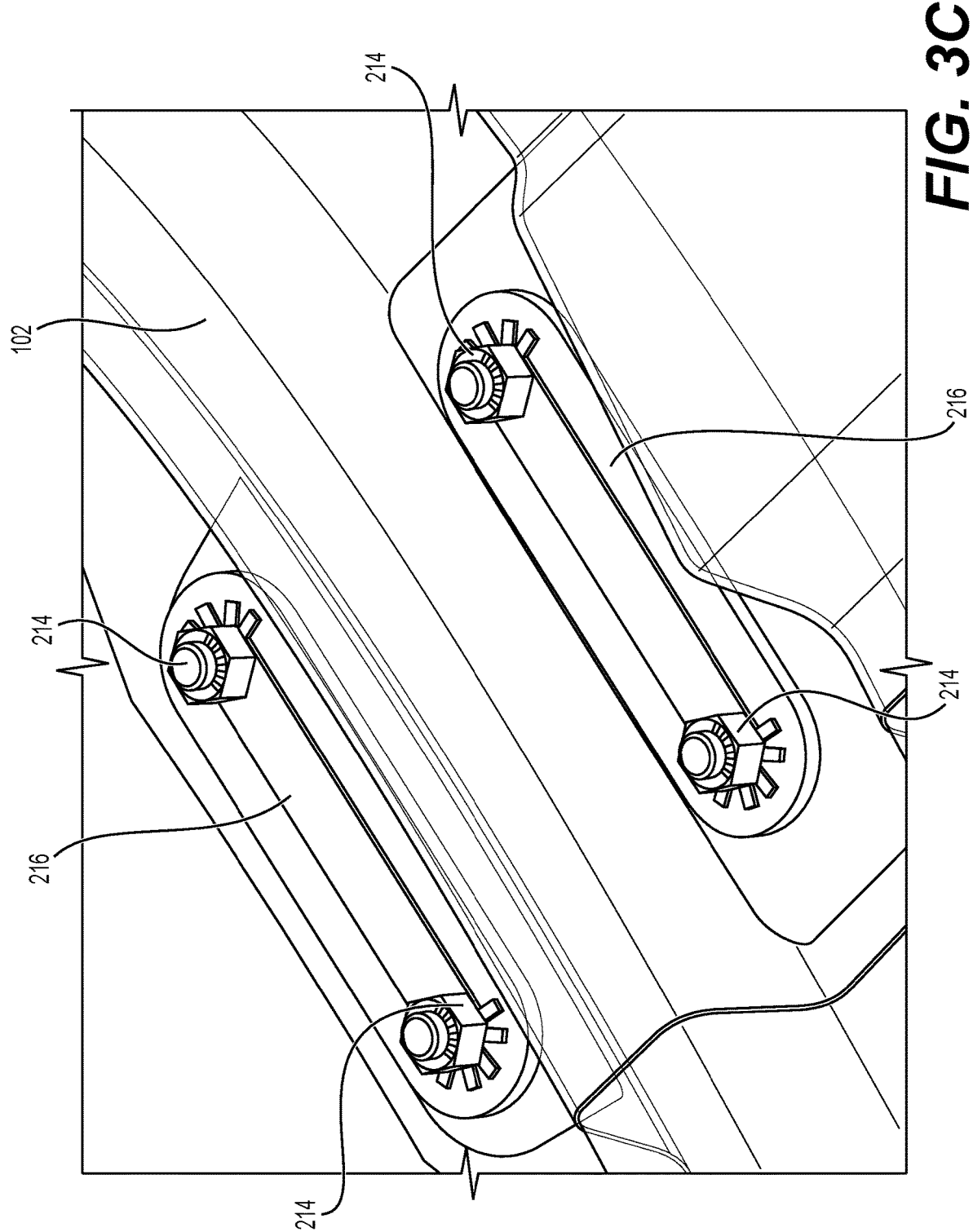
FIG. 3C shows an upper perspective view of the mounting platform of the first joining member mounted to the fuselage structure.
Figure 3D:
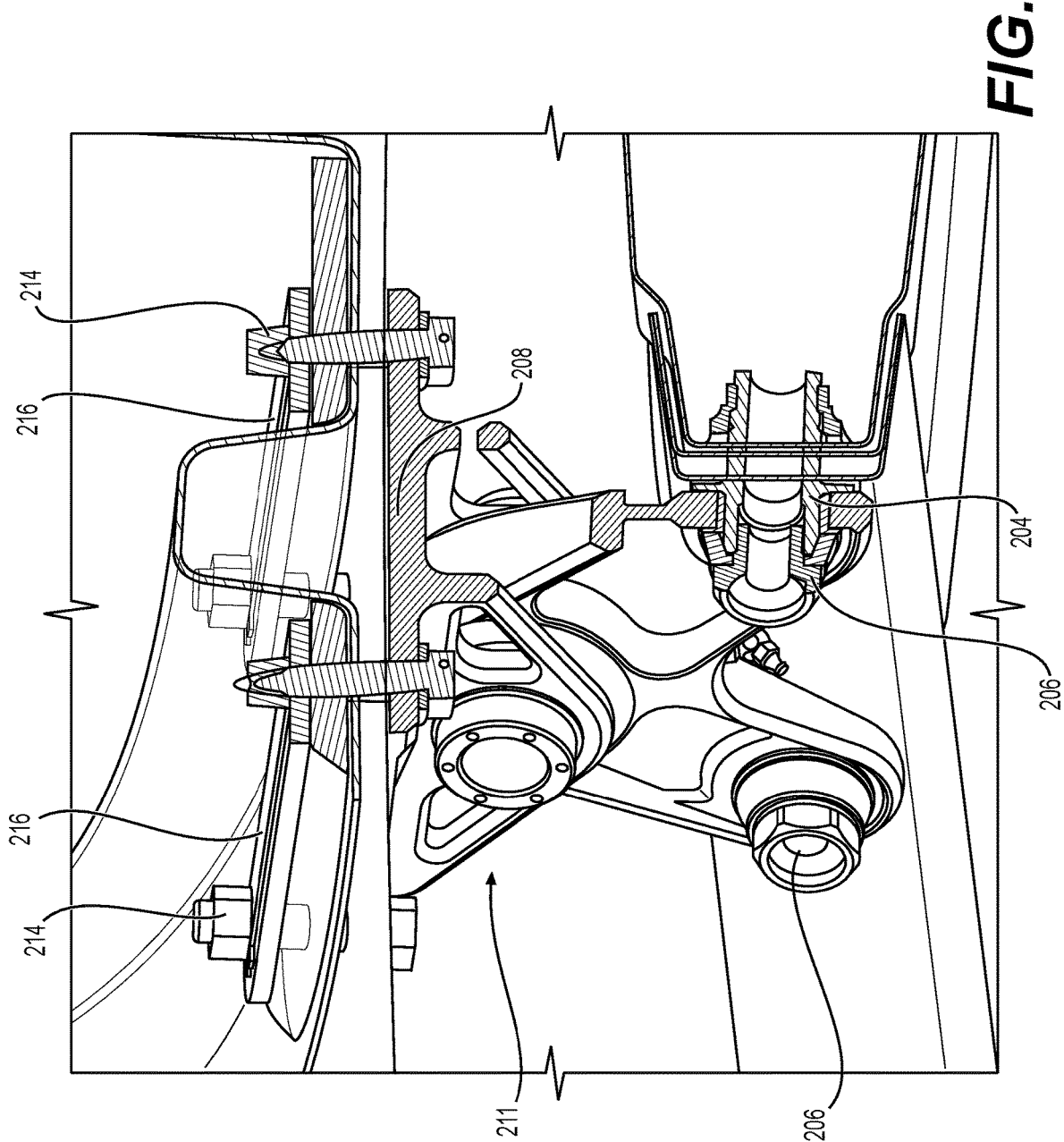
FIG. 3D shows a partially cross-sectional view of the first joining member secured to the spar and fuselage structure.
Figure 3E:
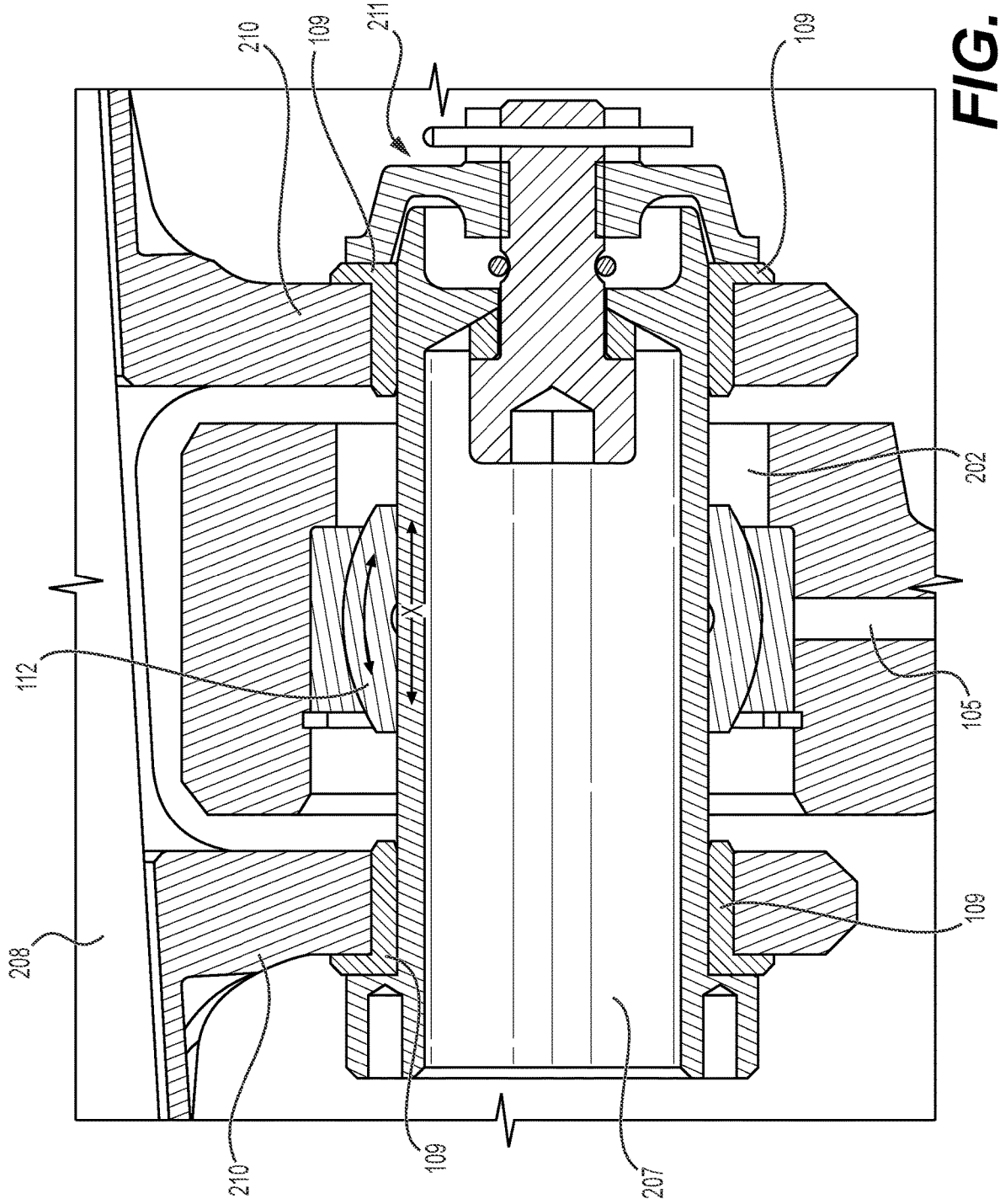
FIG. 3E shows a cross sectional view of the first joining member pivotally mounted to a plane bearing.
Figure 6:
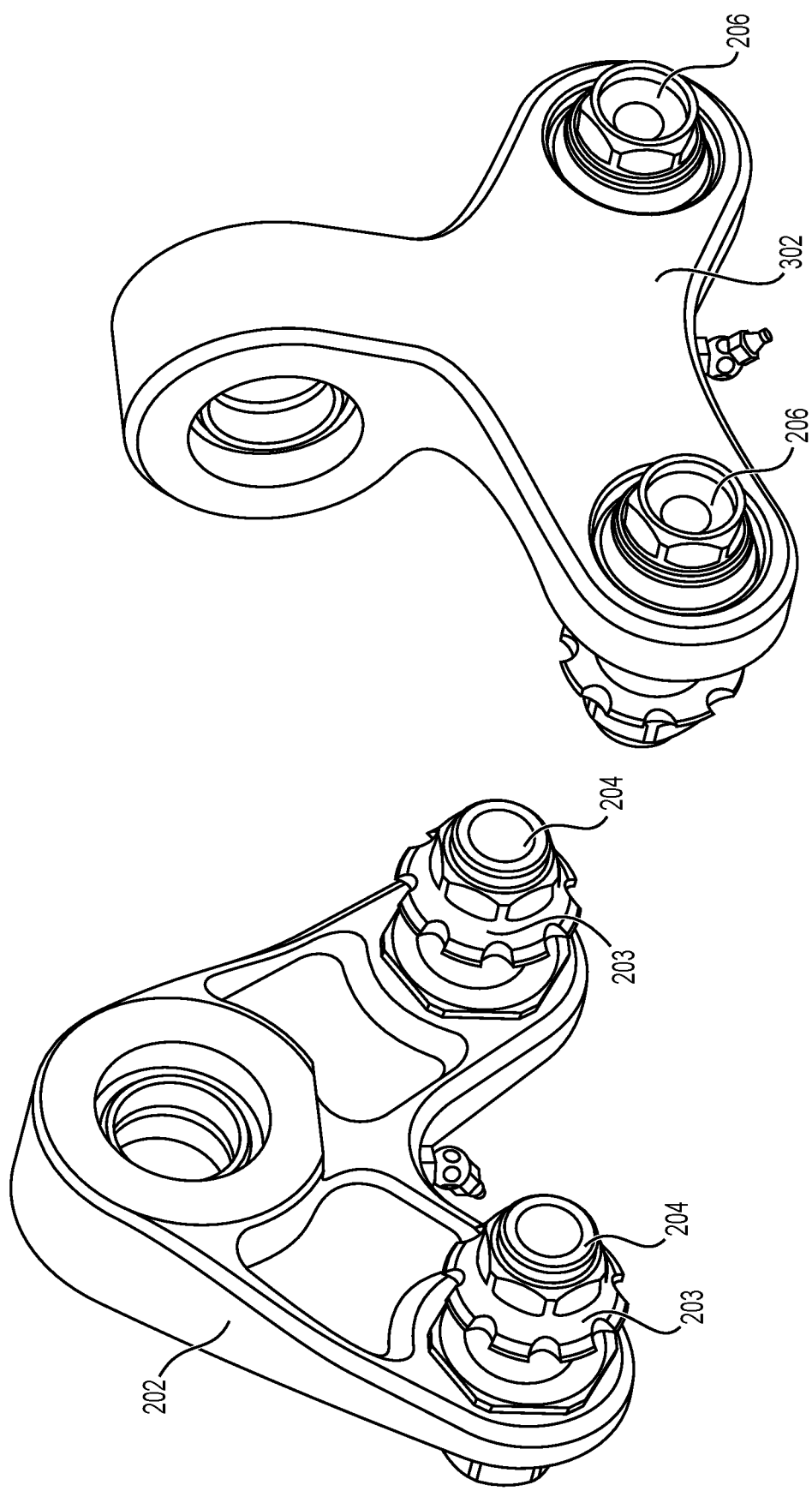
FIG. 6 shows a perspective view of an embodiment of the first bracket of FIG. 2 and the second bracket of FIG. 4.
Figure 7:
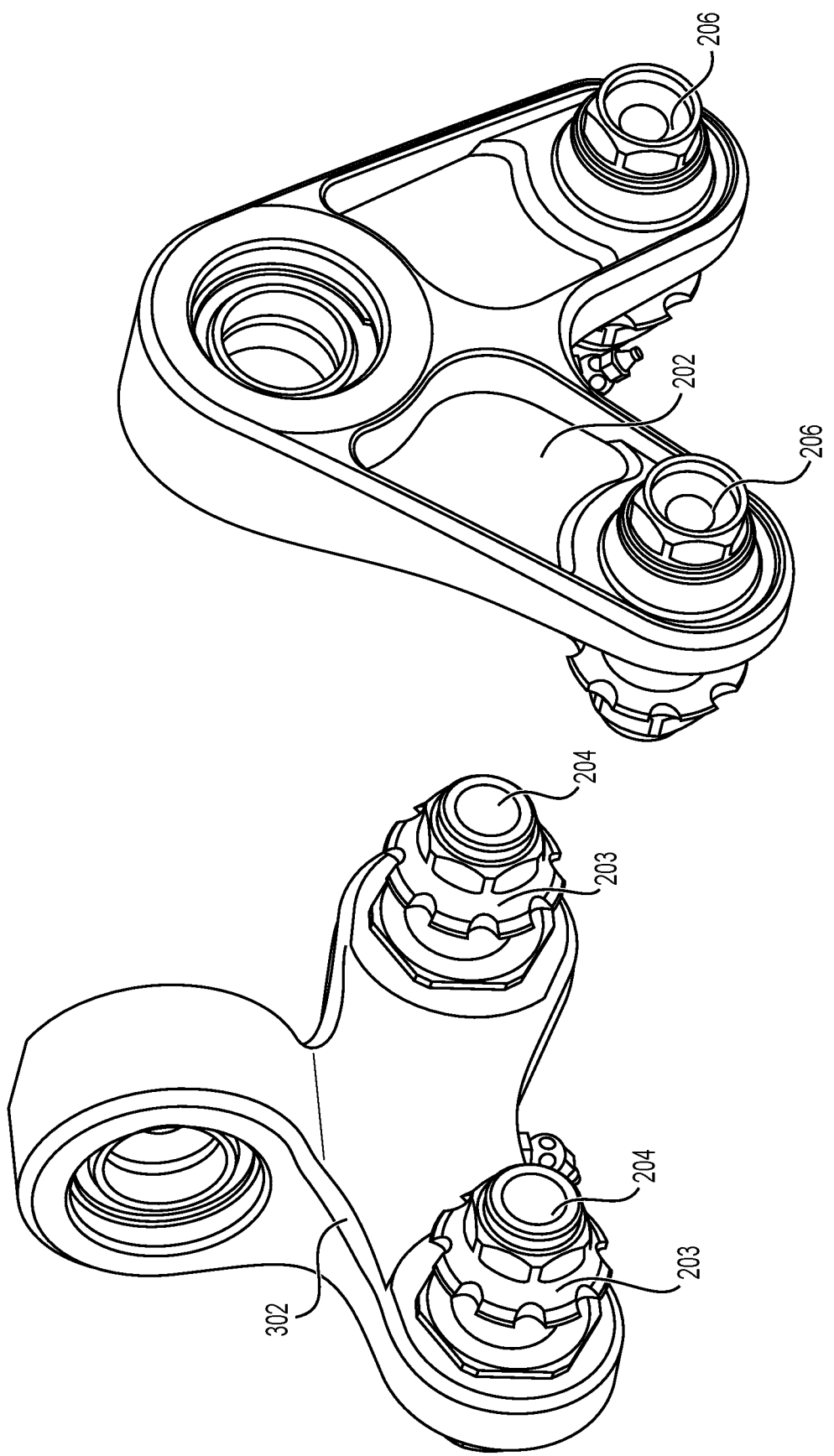
FIG. 7 shows another perspective view of an embodiment of the first bracket of FIG. 2 and the second bracket of FIG. 4.

With reference to FIG. 2 and FIG. 3D, the first bracket 202 has an A shape but could have an L shape, T shape, triangle shape, or other shape without departing from the scope hereof. The first bracket 202 includes a grease nipple 105 so that grease may be applied to grease within the first bracket 202. With reference to FIGS. 6 and 7, the first bracket 202 may be slid onto lamination pins 204 laminated into holes in the spar 104 and positioned such that an end of a pin bolt 206 may be inserted and screwed into the wing lamination pin 204. The wing lamination pins 204 include a lamination nut 203 and a pin spacer 205 configured with the pin bolt 206. The wing lamination pins 204 are laminated into the spar 104 structure which may eliminate the need for elements such as rods to keep the wing lamination pins 204 in place. The mounting platform 208 is pivotally attached at the center of the first bracket 202 using a plane bearing 112 (FIGS. 8A and 8B) fit within the first bracket 202. The fastener holes 211 (one is shown in FIG. 3D) and the wing lamination pins 204 are both aligned with the X-Z plane (the X-Z plane being longitudinal and aligned with the X and Z direction). A shear pin 207 is configured to insert through the aligned fastener holes 211 (FIG. 3E).

FIG. 3B shows a cross sectional view of the first joining member 108 mounted onto the spar 104. The first joining member 108 is secured to the spar 104 by being slid over a wing lamination pin 204 prior to the insertion of the pin bolts 206. The pin bolts 206 are configured to screw directly into the lamination pins 204. In embodiments, a single wing lamination pin 204 is shown adjacent to the pin bolt 206 inserting through the spar 104.

FIG. 3C shows a top perspective view of the first joining member 108 being secured to the fuselage structure 102 using the bolt and nut arrangement 214 and the fastener plate 216. Each of the four bolt of the bolt and nut arrangements 214 insert through formed holes in the fuselage structure 102 such that the fastener plate 216 on either end of the mounting platform 208 are each positioned on the surface of the fuselage structure 102.

FIG. 3D shows the nut threadingly secured on the end of the bolt above the fastener plate 216. The fuselage structure 102 is sandwiched in between the mounting platform 208 and the fastener plate 216 which substantially secures the first joining member 108 to the fuselage structure 102. The mounting platform 208 is rigidly attached to fuselage structure 102 and the plane bearing 112 couples the first bracket 202 to the mounting platform 208 allowing the first bracket 202 to pivot around plane bearing 112 along the Y-Z plane while having the ability to translate in the X direction. This substantially allows for the first joining member 108 to transfer forces experienced by the spar 104 to the fuselage structure 102. For instance, when the spar 104 experiences a force or forces in the Y or Z direction the first joining member 108 allows for the force or forces to be substantially transferred to the fuselage structure 102. A force experienced by the spar 104 may be from an aerodynamic, ground reaction, vibration, or shock load applied to the aircraft on the ground or in flight.

FIG. 3E shows a cross sectional view of the first joining member 108. The flanges 210 extend downwards and are longitudinally spaced apart such that the plane bearing 112 is able to be positioned in between the flanges 210 pivotally coupling the first bracket 202 to the mounting platform 208. The first joining member 108 is configured such that the plane bearing 112 allows the mounting platform 208 to pivot freely and translate in the X direction relative to the first bracket 202. The shear pin 207 is slid through an inner rim 402 of the plane bearing 112 (FIG. 8C) and allows for the first joining member 108 to translate in the X direction due to the clearance between the plane bearing 112 within the first bracket 202 positioned in between the flanges 210. In embodiments, bearings 109 may be press fit into the first bracket 202 such that the shear pins 207 slide through. The bearings 109 may possibly provide rotatability for the shear pins 207 inserted through the first bracket 202.

Figure 4:
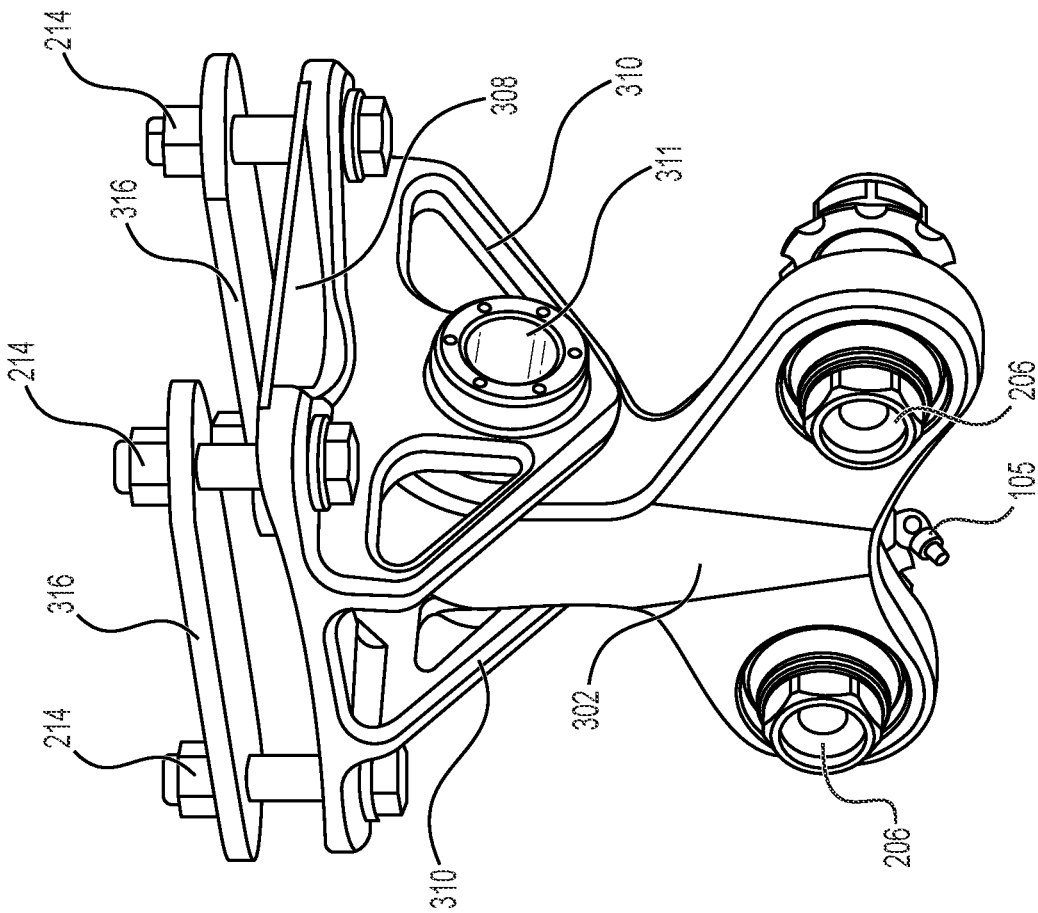
FIG. 4 shows a perspective view of a second joining member of the wing-fuselage joint.

FIG. 4 shows a close-up perspective view of one of the second joining member 110. Each second joining member 110 includes a mounting platform 308. The mounting platform 308 is substantially square shaped in embodiments. At each of the four corners of the mounting platform 308, a bolt and nut arrangement 214 is inserted into a fastener hole in the mounting platform 308. The bolt and nut arrangement 214 is configured such that the bolt head is positioned on the underside surface of the mounting platform 308 such that the shaft of the bolt extends upwards and through the fastener hole in the mounting platform 308. As each bolt shaft extends upwards one end of a fastener plate 316 is slid onto the bolt shaft with a nut being threadingly secured onto the upper end of the bolt shaft. The mounting platform 308 includes two fastener plates 316 which are inserted onto the bolt and nut arrangement 214 similarly to the fastener plate 216 configured with the mounting platform 208. One fastener plate 316 is inserted on one end of the forward-right bolt and nut arrangement 214 and on the other end is secured onto the forward-left bolt and nut arrangement 214. Another fastener plate 316 is inserted onto the back-right bolt and nut arrangement 214 and on the other end is inserted onto the back-left bolt and nut arrangement 214. With reference to FIG. 4, the fastener plates 316 span from the right to the left edges of the mounting platform 308 being positioned along the forward and back sides of the mounting platform 308.

Figure 5A:
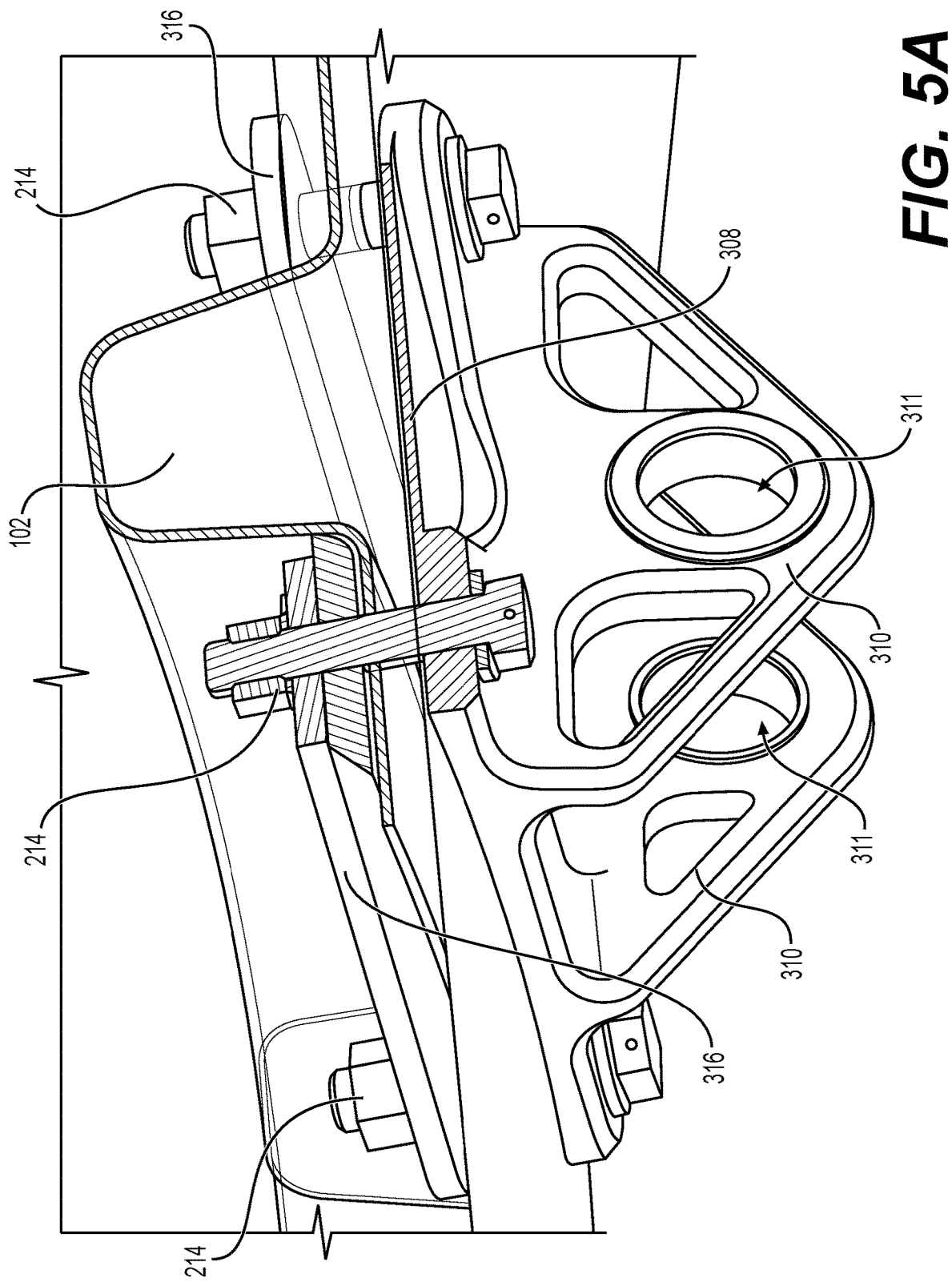
FIG. 5A shows a perspective view of a mounting platform of the second joining member of FIG. 4 mounted to a fuselage structure.

FIG. 5A shows a bottom perspective view of the mounting platform 308 mounted to the fuselage structure 102. The mounting platform 308 includes two downwardly extending flanges 310 which each include a fastener hole 211 diametrically sized to allow a shear pin 207 to insert and couple the mounting platform 208 to a plane bearing 112 (FIG. 3D). The flanges 310 are spaced opposite each other and mounted on the underside of the mounting platform 208 such that a second bracket 302 (FIG. 3D) is able to pivot on the plane bearing 112 in between the flanges 310.

Figure 5B:
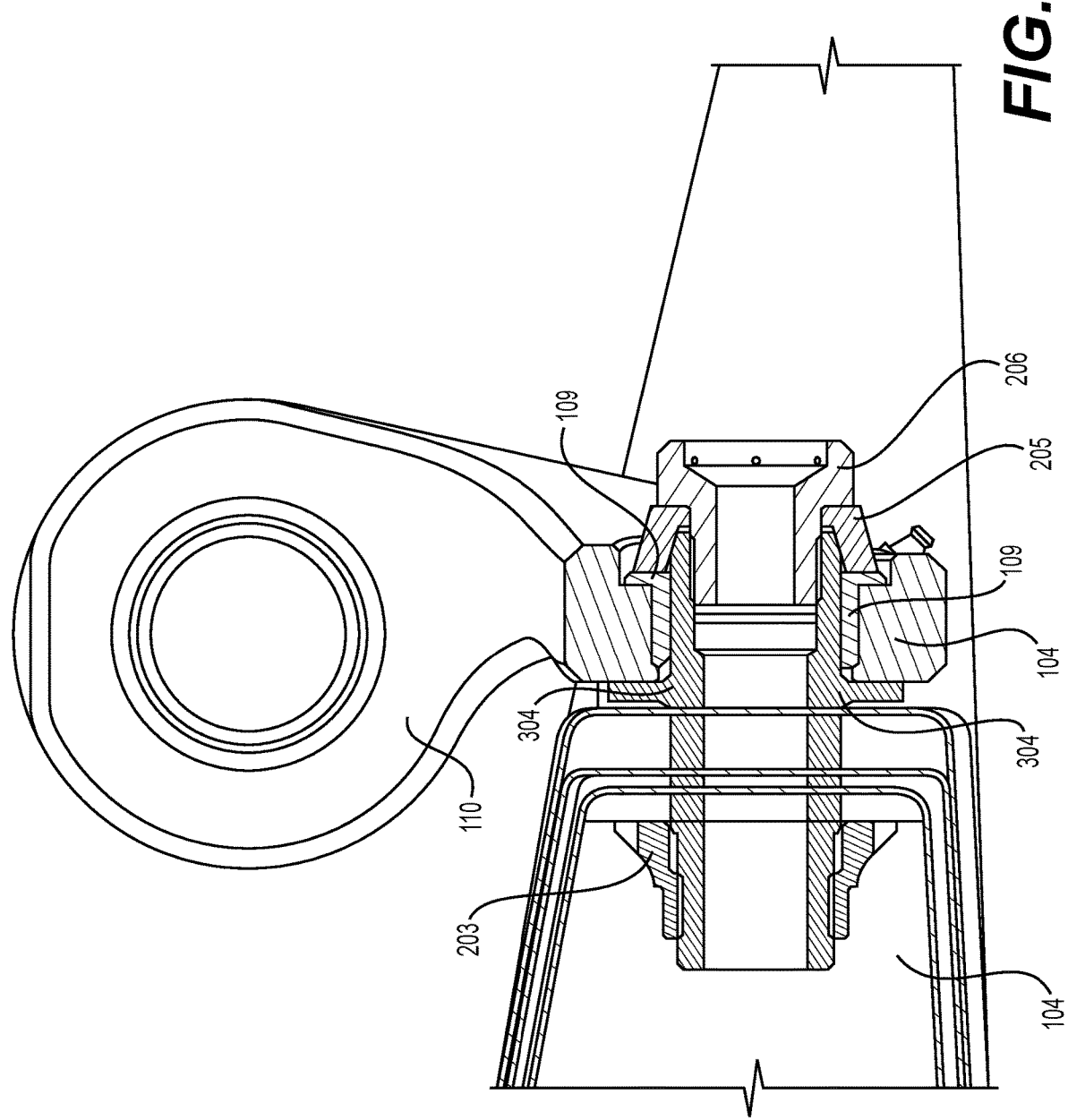
FIG. 5B shows a cross-sectional view of the second joining member mounted to a spar of a wing.
Figure 5C:
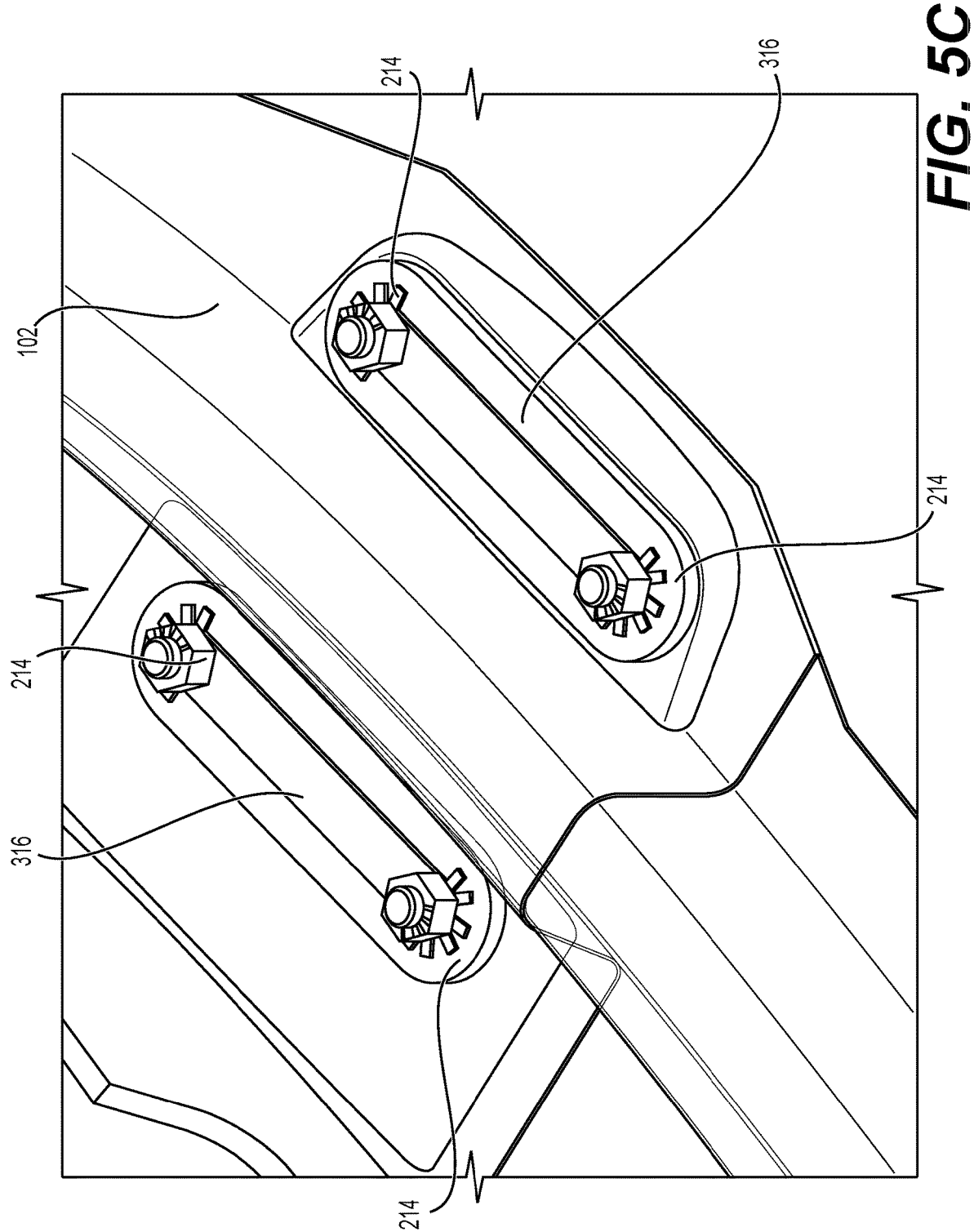
FIG. 5C shows an upper perspective view of the mounting platform of the second joining member mounted to the fuselage structure.
Figure 5D:
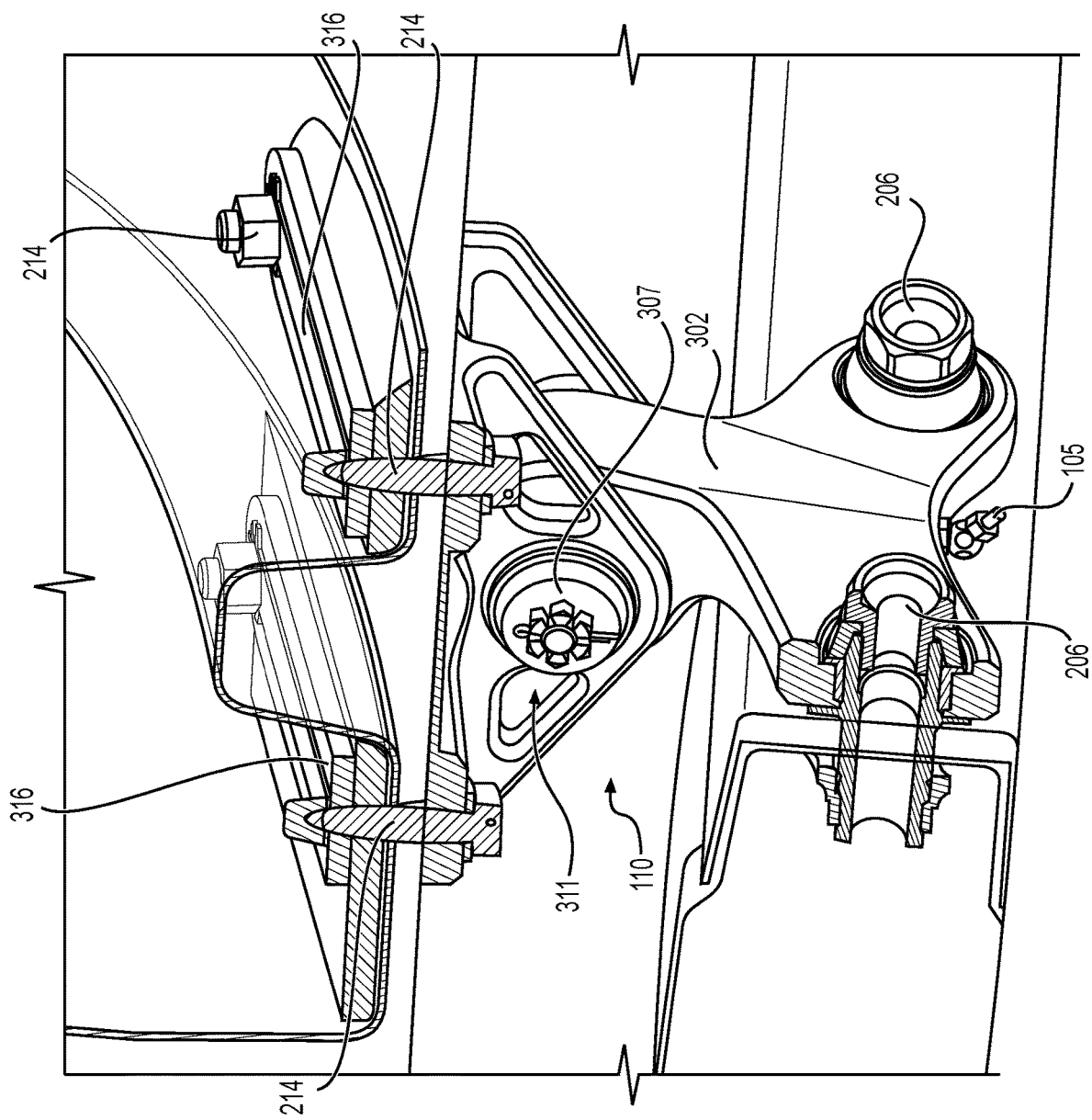
FIG. 5D shows a partially cross-sectional view of the second joining member secured to the spar and fuselage structure.

With reference to FIG. 4 and FIG. 5D, the second bracket 302 which, in embodiments, includes three extending arms. Two extending arms of the second bracket 302 extend downwards with reference to FIG. 4, with each arm end being slide through a wing lamination pin 304 (also shown in FIG. 5B) securing an end of a pin bolt 206 to each downwardly extending arm. The wing lamination pins 304 include a lamination nut 203 and a pin spacer 205 configured with the pin bolt 206. The wing lamination pins 304 are laminated into the spar 104 structure which may eliminate the need for elements such as rods to keep the wing lamination pins 304 in place. The mounting platform 308 is pivotally attached at the center of the second bracket 302 using a plane bearing 112 (FIGS. 8A and 8B) press fit within the second bracket 302. The fastener holes 311 (one is shown in FIG. 3D) are aligned in the Y-Z plane perpendicular to the wing lamination pins 304 aligned in the X-Z plane (the Y-Z plane being lateral and aligned with the Y and Z direction). A shear pin 307 is configured to insert through the aligned fastener holes 311.

FIG. 5B shows a cross sectional view of the second joining member 110 mounted onto the spar 104. The second joining member 110 is secured to the spar 104 using pin bolts 206 which screw directly into wing lamination pins 304 laminated into the spar 104. In embodiments, two wing lamination pins 304 are shown adjacent to the pin bolts 206.

FIG. 5C shows a top perspective view of the second joining member 110 being secured to the fuselage structure 102 using the bolt and nut arrangement 214 and the fastener plate 316. Each of the four bolt of the bolt and nut arrangements 214 insert through formed holes in the fuselage structure 102 such that the fastener plate 216 on either end of the mounting platform 208 are each positioned on the surface of the fuselage structure 102.

FIG. 5D shows the nut threadingly secured on the end of the bolt above the fastener plate 316. The fuselage structure 102 is sandwiched in between the mounting platform 308 and the fastener plate 316 which substantially secures the second joining member 110 to the fuselage structure 102. The mounting platform 308 is rigidly attached to fuselage structure 102 and the plane bearing 112 couples the second bracket 302 to the mounting platform 308 allowing the second bracket 302 to pivot around plane bearing 112 along the X-Z plane while having the ability to translate in the Y direction. This substantially allows for the first joining member 108 to transfer forces experienced by the spar 104 to the fuselage structure 102. For instance, when the spar 104 experiences a force or forces in the X or Z direction the second joining member 110 allows for the force or forces to be substantially transferred to the fuselage structure 102. A force experienced by the spar 104 may be from an aerodynamic, ground reaction, vibration, or shock load applied to the aircraft on the ground or in flight.

Figure 5E:
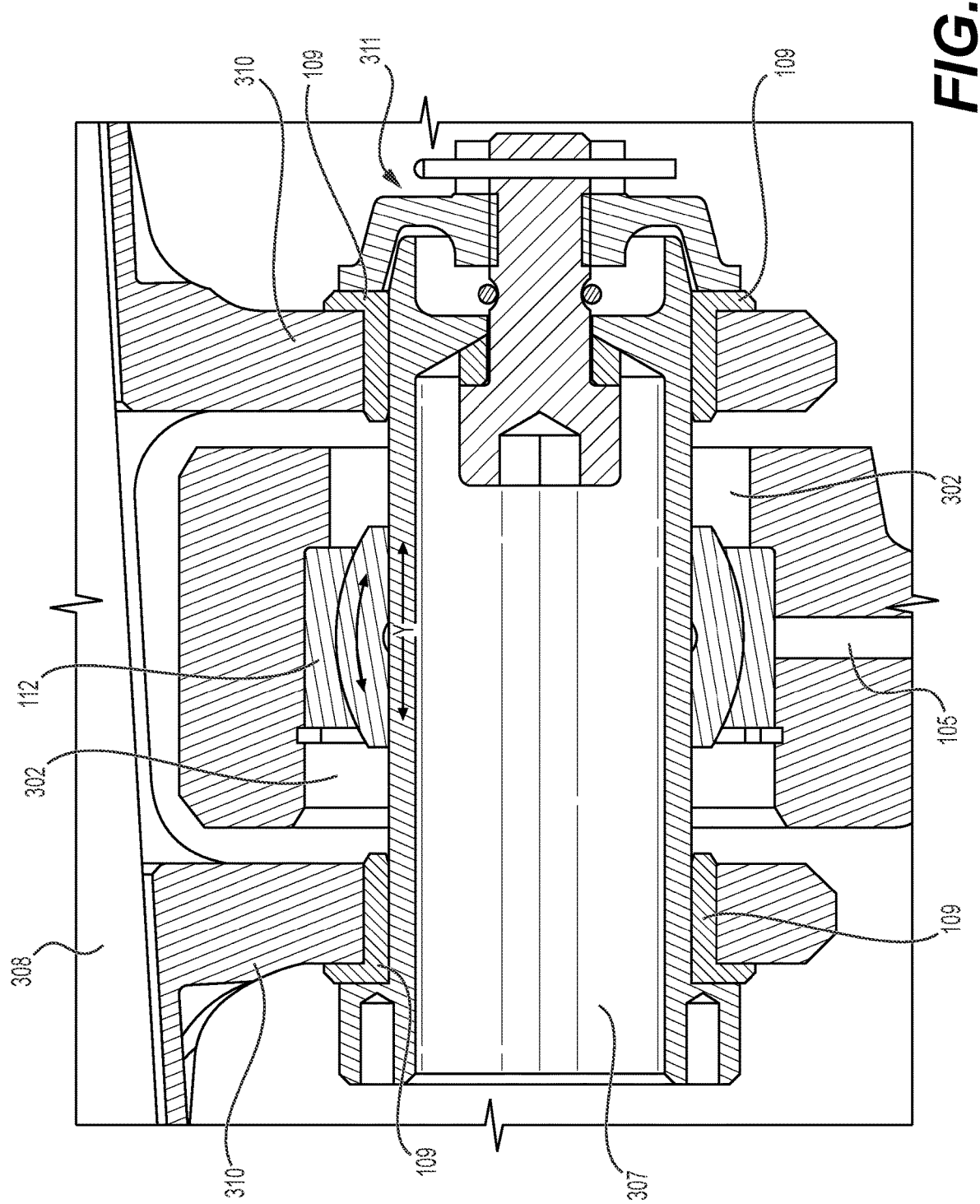
FIG. 5E shows a cross sectional view of the second joining member pivotally mounted to a plane bearing.

FIG. 5E shows a cross sectional view of the second joining member 110. The flanges 310 extend downwards and are longitudinally spaced apart such that the plane bearing 112 is able to be positioned in between the flanges 310 pivotally coupling the second bracket 302 to the mounting platform 308. The second joining member 110 is configured such that the plane bearing 112 allows the mounting platform 308 to pivot freely and translate in the Y direction relative to the second bracket 302. The shear pin 307 is slid through an inner rim 402 of the plane bearing 112 (FIG. 8C) and allows for the second joining member 110 to translate in the Y direction due to the clearance between the plane bearing 112 fit within the second bracket 302 positioned in between the flanges 310. In embodiments, bearings 109 may be press fit into the second bracket 202 such that the shear pins 307 slide through. The bearings 109 may possibly provide rotatability for the shear pins 307 inserted through the second bracket 302.

FIG. 6 shows a perspective view of an embodiment with the second bracket 302 forward of the first bracket 202 each including the wing lamination pins 204, pin bolts 206 and the lamination nuts 203. When coupled to the wing structure, the pin bolts 206 are screwed into the wing lamination pins 204 laminated into holes in the spar 104 and mount the first bracket 202 and second bracket 302 to the spar 104 structure. The first bracket 202 allows the mounting platform 208 to freely rotate and translate in the X direction relative to the fuselage structure 102. This allows for forces experienced by the spar 104 in the Y or Z directions to be transferred to the fuselage structure 102. The second bracket 302 allows the mounting platform 308 to freely rotate and translate in the Y direction relative to the fuselage structure 102. This allows for forces experienced by the spar 104 in the X or Z directions to be transferred to the fuselage structure 102. The brackets 202 and 302 when attached to the mounting platforms 208 and 308 as shown in FIG. 1 are configured such that the first joining member 108 and the second joining member 110 are positioned on the same side (i.e. left or right) of the fuselage structure 102 which enables forces experienced by the spar 104 in the X and Y directions to be substantially reduced due pivoting or translation accomplishable by both the first joining member 108 and the second joining member 110. Since both the first joining member 108 and the second joining member 110 allow for free rotation about the plane bearing 112 in either the Y-Z plane or the X-Z plane, a moment load applied in the Z direction to the spar 104 would be minimally transferred or eliminated from travelling to the fuselage structure 102. In embodiments, when fully assembled as shown in FIG. 1, the diagonal configuration of the first joining member 108 and the second joining member 110 allow for local translations in either the X direction or the Y direction (i.e. first joining member 108 allows X direction translation and second joining member 110 allows Y direction translation) substantially enabling the wing to bend and deform with minimum restraint and the reaction forces on the wing spars 104 and on the fuselage structure 102 to be reduced. This may include substantially eliminating the bending moment applied from the lifting force to the wings from being transferred to the fuselage of an aircraft. The first joining member 108 and the second joining member 110 each are configured to have free rotation in the Y-Z plane or X-Z plane which allows wing displacement caused from upwards bending (i.e. a force applied in the Z direction) to occur.

FIG. 7 shows a perspective view of an embodiment with the first bracket 202 forward of the second bracket 302. The second bracket 302 when attached to the mounting platform 308 (shown in FIG. 4) allows the mounting platform 308 to freely pivot in the X-Z plane and translate in the Y direction relative to the fuselage structure 102. This allows for forces experienced by the spar 104 in the X or Z directions to be transferred to the fuselage structure 102. The first bracket 202 when attached to the mounting platform 208 (shown in FIG. 1) allows the mounting platform 208 to freely pivot in the Y-Z plane and translate in the X direction relative to the fuselage structure 102. This allows for forces experienced by the spar 104 in the Y or Z directions to be transferred to the fuselage structure 102. Both the first bracket 202 and second bracket 302 when attached to the mounting platform 208 and mounting platform 308 allow the first joining member 108 and the second joining member 110 to be positioned on the same side (i.e. left or right side) of the fuselage structure 102 which enables forces experienced by the spar 104 in the X and Y directions to be substantially reduced due to pivoting accomplishable by both the first joining member 108 and the second joining member 110. Since both the first joining member 108 and the second joining member 110 are able to freely pivot in either the Y-Z plane or the X-Z plane about the plane bearing 112 the wings are able to bend and deform with minimal restraint while reaction forces on the fuselage structure 102 and spar 104 are significantly reduced.

Figure 8B:
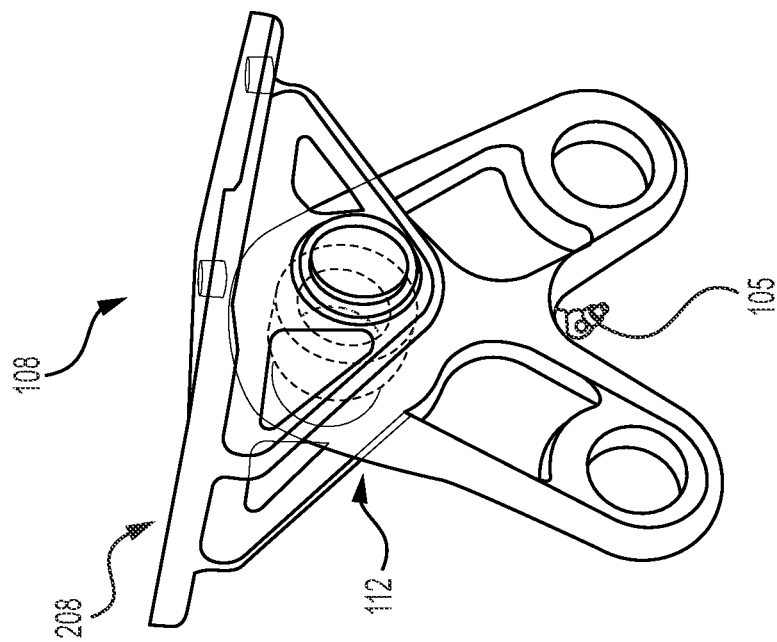
FIG. 8B shows a partially internal view of the second joining member of FIG. 4.
Figure 8A:
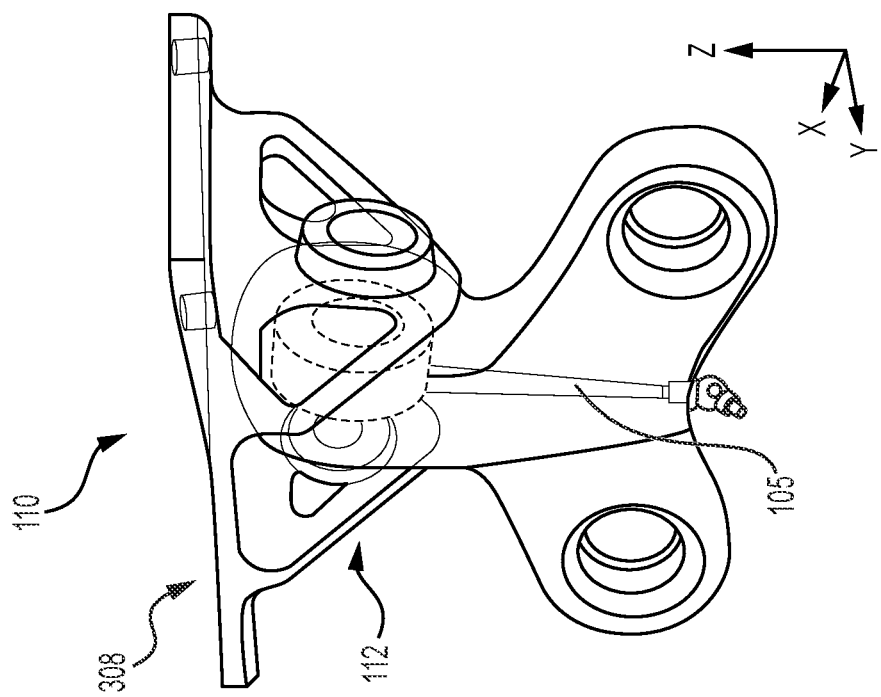
FIG. 8A shows a partially internal view of the first joining member of FIG. 2.
Figure 8C:
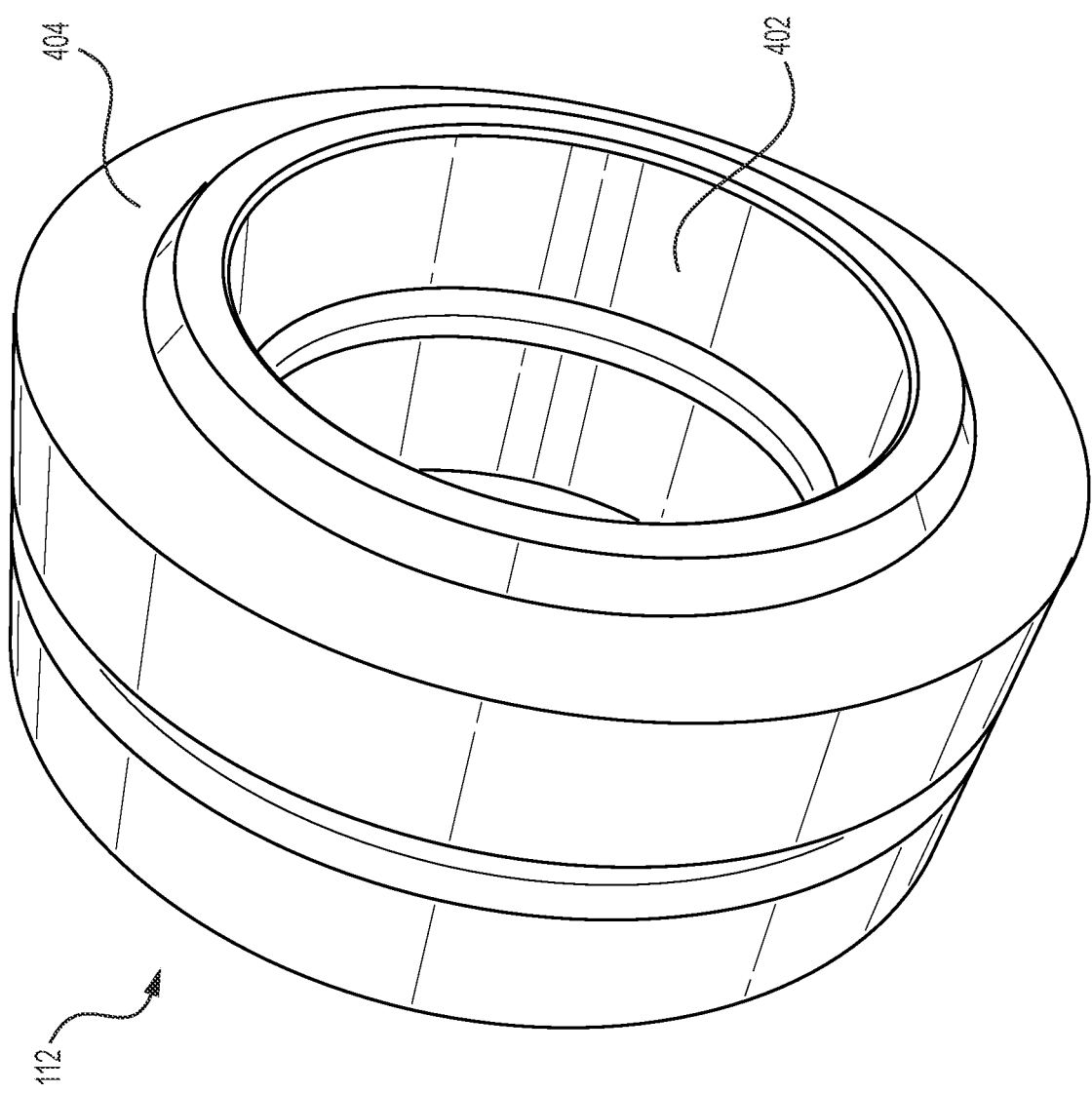
FIG. 8C shows a perspective view of the plane bearing of FIG. 3E and FIG. 5E.

FIGS. 8A and 8B provide an internal view of the first joining member 108 and the second joining member 110 respectively. The first joining member 108 and the second joining member 110 each include a plane bearing 112. FIG. 8C shows the plane bearing 112 which includes an inner rim 402 and an outer rim 404 with each rim having a common center. The outer rim 404 is configured to rotate independently of the inner rim 402. With respect to FIG. 8A, the rotation of the plane bearing 112 allows for the mounting platform 208 to pivot in the Y-Z plane relative to the first bracket 202. With respect to FIG. 8B, the rotation of the plane bearing 112 allows for the mounting platform 308 to pivot in the X-Z plane relative to the second bracket 302. In embodiments, the plane bearing 112 may be an SKF™ GE_30_ESX_2LS type bearing which may be press fit into either the first bracket 202 or second bracket 302. The inner rim 402 of the plane bearing 112 has a diameter which allows the shear pin 207 or the shear pin 307 to insert and slide into the plane bearing 112 so the first joining member 108 is able to translate in the X direction and the second joining member 110 is able to translate in the Y direction. For instance, when installed onto the fuselage structure 102 and spar 104 the first joining member 108 is configured to allow the wing to pivot in the Y-Z plane and not translate in the Y and Z direction while the second joining member 110 is configured to allow the wing to pivot in the X-Z plane and not translate in the X and Z direction. This allows the wing-fuselage joint 100 to be flexible while providing strength simultaneously.

The joining members 106 may be arranged in strategic ways and locations about the aircraft fuselage 102 and the wing spar 104 to create an optimal wing-fuselage joint 100. The joining members 106 may be arranged based upon the specific aircraft wing-fuselage configuration, load paths, installation, production tolerance, and possible disassembly requirements. For instance, with respect to FIG. 1, the first joining members 108 and the second joining members 110 may be switch frontward and rearward and leftward and rightward based upon the load path of the aircraft or another characteristic apparent to one skilled in the art. The wing-fuselage joint 100 may be implemented on numerous different types of aircraft including commercial and military airplanes, helicopters, vertical take off and landing aircraft, and unmanned aerial vehicles.

The wing-fuselage joint 100 is able to substantially reduce various types of loading which may be experienced by an aircraft such as aerodynamic loads, ground reaction loads, wing mounted propeller lifting loads, vibration loads, shock loads, and thermal loads which may be reduced by free planar rotation and X or Y translation of the mounting platform 208 and mounting platform 308 mounted to the spar 104 of the aircraft. Additionally, the wing-fuselage joint 100 including the plane bearing 112 and securing arrangement connections allow for a quicker assembly and disassembly process than current methods. The wing-fuselage joint 100 allows for greater production tolerance errors while reducing the production tool cost and complexity due to its translatability and rotatability. The configuration of the wing-fuselage joint 100 allows for minor movements and deformations of the aircraft to have little impact on the overall performance of the aircraft. The wing-fuselage joint 100, in embodiments, includes four joining members 106 of the first configuration or second configuration which each secure the fuselage structure 102 and the spar 104 structures together. In this configuration, the wing-fuselage joint 100 is able to claim fail-safe design characteristics due to each of the joining members 106 being able to possess significant load carrying capacity in case instances where one or more joining members 106 fail.

Features described above as well as those claimed below may be combined in various ways without departing from the scope hereof. The following clauses illustrate some possible, non-limiting combinations:

Clause 1. A wing-fuselage joint for an aircraft comprising: a first joining member, the first joining member including a first bracket pivotally mounted to a first platform, wherein the first platform is configured to mechanically couple to a fuselage structure and the first bracket is configured to mechanically couple to a wing spar; the first platform being configured to pivot in a first plane and translate in a second direction, wherein the first plane is lateral and aligned with the wing spar and the second direction is perpendicular in relation to the wing spar; a second joining member, the second joining member including a second bracket pivotally mounted to a second platform, wherein the second platform is configured to mechanically couple to the fuselage and the second bracket is configured to mechanically couple to the wing spar; and the second platform being configured to pivot in a second plane and translate in a first direction, wherein the second plane is longitudinal and aligned with the second direction and the first direction is lateral and aligned with the first plane.

Clause 2. The wing fuselage joint of clause 1 wherein a forward first joining member mechanically couples a forward spar and a forward bulkhead and an aft first joining member mechanically couples an aft spar and an aft bulkhead and a forward second joining member mechanically couples a forward spar and forward bulkhead and an aft second joining member mechanically couples an aft spar and an aft bulkhead.

Clause 3. The wing fuselage joint of clauses 1-2 wherein the forward first joining member and the aft first joining member are diagonally opposed to one another, the forward second joining member and the aft second joining member are diagonally opposed to one another.

Clause 4. The wing fuselage joint of clauses 1-3 wherein the first bracket and the second bracket each include a first extending arm and a second extending arm, wherein the first and second extending arms each are configured to receive a pin bolt.

Clause 5. The wing fuselage joint of clauses 1-4 wherein a pin bolt is secured into the first and second extending arms of the first bracket, and another pin bolt is secured into the first and second extending arms of the second bracket.

Clause 6. The wing fuselage joint of clauses 1-5 wherein wing lamination pins are laminated into the aft spar and the wing lamination pins are laminated into the forward spar.

Clause 7. The wing fuselage joint of clauses 1-6 wherein a lamination nut and a pin spacer are inserted onto each pin bolt.

Clause 8. The wing fuselage joint of clauses 1-7 wherein the first joining member includes a first plane bearing and the second joining member includes a second plane bearing.

Clause 9. The wing fuselage joint of clauses 1-8 wherein the first plane bearing is fit into the first bracket and mechanically couples the first bracket to the first platform and allows the first platform to pivot in the first plane.

Clause 10. The wing fuselage joint of clauses 1-9 wherein the second plane bearing is fit into the second bracket and mechanically couples the second bracket to the second platform and allows the second platform to pivot in the second plane.

Clause 11. The wing fuselage joint of clauses 1-10 wherein the first platform is secured to the fuselage structure by a first fastener plate and a second fastener plate aligned in the first plane wherein the fuselage structure is sandwiched in between a surface of the first platform and the first and second fastener plates.

Clause 12. The wing fuselage joint of clauses 1-11 wherein the second platform is secured to the fuselage structure by a first fastener plate and a second fastener plate aligned in the second plane wherein the fuselage structure is sandwiched in between a surface of the second platform and the first and second fastener plates.

Clause 13. The wing fuselage joint of clauses 1-12 wherein the first and second fastener plates are secured using a nut and bolt arrangement.

Clause 14. The wing fuselage joint of clauses 1-13 wherein the first platform includes a first pair of oppositely opposed flanges extending away from the first platform and the second platform includes a second pair of oppositely opposed flanges extending away from the second platform.

Clause 15. The wing fuselage joint of clauses 1-14 wherein the first pair of oppositely opposed flanges are opposingly spaced such that the first plane bearing fitted within the first bracket may translate the first bracket in the second direction, and the second pair of oppositely opposed flanges are opposingly spaced such that the second plane bearing fitted within the second bracket may translate the second bracket in the first direction.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A wing-fuselage joint for an aircraft comprising:
a first joining member, the first joining member including a first bracket pivotally mounted to a first platform, wherein the first platform is configured to mechanically couple to a fuselage structure and the first bracket is configured to mechanically couple to a wing spar;
the first platform being configured to pivot in a first plane and translate in a second direction, wherein the first plane is lateral and aligned with the wing spar and the second direction is perpendicular in relation to the wing spar;
a second joining member, the second joining member including a second bracket pivotally mounted to a second platform, wherein the second platform is configured to mechanically couple to the fuselage and the second bracket is configured to mechanically couple to the wing spar; and
the second platform being configured to pivot in a second plane and translate in a first direction, wherein the second plane is longitudinal and aligned with the second direction and the first direction is lateral and aligned with the first plane.

2. The wing fuselage joint of claim 1 wherein the first platform is secured to the fuselage structure by a first fastener plate and a second fastener plate aligned in the first plane wherein the fuselage structure is sandwiched in between a surface of the first platform and the first and second fastener plates.

3. The wing fuselage joint of claim 1 wherein a forward first joining member mechanically couples a forward spar and a forward bulkhead and an aft first joining member mechanically couples an aft spar and an aft bulkhead and a forward second joining member mechanically couples a forward spar and forward bulkhead and an aft second joining member mechanically couples an aft spar and an aft bulkhead.

4. The wing fuselage joint of claim 3 wherein the forward first joining member and the aft first joining member are diagonally opposed to one another, the forward second joining member and the aft second joining member are diagonally opposed to one another.

5. The wing fuselage joint of claim 1 wherein the second platform is secured to the fuselage structure by a first fastener plate and a second fastener plate aligned in the second plane wherein the fuselage structure is sandwiched in between a surface of the second platform and the first and second fastener plates.

6. The wing fuselage joint of claim 5 wherein the first and second fastener plates are secured using a nut and bolt arrangement.

7. The wing fuselage joint of claim 1 wherein the first platform includes a first pair of oppositely opposed flanges extending away from the first platform and the second platform includes a second pair of oppositely opposed flanges extending away from the second platform.

8. The wing fuselage joint of claim 7 wherein the first pair of oppositely opposed flanges are opposingly spaced such that the first plane bearing fitted within the first bracket may translate the first bracket in the second direction, and the second pair of oppositely opposed flanges are opposingly spaced such that the second plane bearing fitted within the second bracket may translate the second bracket in the first direction.

9. The wing fuselage joint of claim 1 wherein the first joining member includes a first plane bearing and the second joining member includes a second plane bearing.

10. The wing fuselage joint of claim 9 wherein the first plane bearing is fit into the first bracket and mechanically couples the first bracket to the first platform and allows the first platform to pivot in the first plane.

11. The wing fuselage joint of claim 9 wherein the second plane bearing is fit into the second bracket and mechanically couples the second bracket to the second platform and allows the second platform to pivot in the second plane.

12. The wing fuselage joint of claim 1 wherein the first bracket and the second bracket each include a first extending arm and a second extending arm, wherein the first and second extending arms each are configured to receive a pin bolt.

13. The wing fuselage joint of claim 12 wherein a pin bolt is secured into the first and second extending arms of the first bracket, and another pin bolt is secured into the first and second extending arms of the second bracket.

14. The wing fuselage joint of claim 13 wherein wing lamination pins are laminated into the aft spar and the wing lamination pins are laminated into the forward spar.

15. The wing fuselage joint of claim 13 wherein a lamination nut and a pin spacer are inserted onto each pin bolt.

* * * * *